United States Patent [19]
Barker et al.

[11] 3,922,241
[45] Nov. 25, 1975

[54] ASBESTOS-FREE HEAT-RESISTANT THERMOSETTABLE PHENOL-ALDEHYDE MOLDING COMPOSITION

[75] Inventors: Richard H. Barker, Dalton; Frank P. Florentine, Pittsfield, both of Mass.

[73] Assignee: General Electric Company, Pittsfield, Mass.

[22] Filed: June 12, 1974

[21] Appl. No.: 478,785

[52] U.S. Cl................................ 260/17.2; 260/38
[51] Int. Cl.².......................................... C08L 1/02
[58] Field of Search............................ 260/17.2, 38

[56] References Cited
UNITED STATES PATENTS

| | | | |
|---|---|---|---|
| 3,567,667 | 3/1971 | Rumbold | 260/17.2 |
| 3,658,750 | 4/1972 | Tsukui et al. | 260/38 |
| 3,813,356 | 5/1974 | Lievremont et al. | 260/2.5 |

OTHER PUBLICATIONS

Chem. Abst. 68:11540f, "Structural Material — Resins — Filler," Yatsenko et al.

*Primary Examiner*—Donald E. Czaja
*Assistant Examiner*—Edward Woodberry
*Attorney, Agent, or Firm*—William F. Mufatti; Donald M. Papuga

[57] ABSTRACT

An asbestos free, heat resistant phenolic molding composition comprising in admixture, a phenolic resin and a filler combination of aluminum silicate, talc and cellulose fibers.

6 Claims, No Drawings

ASBESTOS-FREE HEAT-RESISTANT THERMOSETTABLE PHENOL-ALDEHYDE MOLDING COMPOSITION

This invention relates to an asbestos free, heat resistant phenolic molding composition comprising in admixture a phenolic resin and a filler combination of aluminum silicate, talc and cellulose fibers.

BACKGROUND OF THE INVENTION

Phenolic molding compositions have been available for many years and are generally made with an asbestos filler. The asbestos is used as a reinforcing fiber or as a reinforcing filler. The asbestos provides the phenolic molding composition with increased mechanical, thermal and electrical properties. However, the use of asbestos filled phenolics provides a hazard to those exposed to this type of material.

The standard for direct exposure to asbestos fibers is clearly detailed by the Department of Labor's Occupational Safety and Health Administration (OSHA). Effects of exposure to personnel involved in the manufacture of phenolic molding compound in which raw asbestos is handled or processed is well delineated. What is less obvious is the health hazard to personnel in shops that mold asbestos material and finish or machine the molded parts.

In order to comply with OSHA standards dealing with asbestos, the development of asbestos-free phenolic molding compositions which comply with the OSHA law is needed. However, there are properties problems associated with eliminating asbestos from phenolic molding compositions. Two of the key properties effected are dimensional stability and heat resistance.

The heat resistance, mechanical and electrical properties of the non-asbestos phenolic molding compositions must be at least equivalent to the asbestos-containing compositions. Additionally, the moldability of the non-asbestos compositions must be equivalent to the asbestos-filled compositions. Since the same mold is used for asbestos and non-asbestos compositions, the shrinkage of both types should be similar. In short, the non-asbestos compositions should not change normal operation procedures, at least in a deleterious sense.

The non-asbestos filler combination of the instant invention satisfies this criteria.

DESCRIPTION OF THE INVENTION

The invention is directed to an asbestos-free heat resistant phenolic molding composition comprising in admixture, a phenolic resin and a filler combination of aluminum silicate, talc and cellulose fibers.

The filler combination of the instant invention when used with the phenolic resin provides a molding composition having heat resistant properties better than an asbestos filled phenolic resin composition. Also, heat deflection temperature and dielectric strength are greater using the filler combination of the instant invention in place of asbestos in phenolic resins. Additionally, water absorption, arc resistance, tensile strength, flexural strength, flexural modulus, compressive strength, Izod impact and drop ball impact properties of a phenolic resin with the filler combination of the instant invention are comparable to an asbestos filled phenolic resin composition.

The phenolic resin employed in the practice of this invention is preferably a phenol-aldehyde resin and can be any phenol-aldehyde resin which is prepared by reacting from less than one mole to more than one mole of an aldehyde per mole of phenol under certain conditions to provide a resin. If less than one mole of an aldehyde is used, the resin so produced is commonly called a novolac. The novolac resin is generally the type that can be finely ground and requires blending thereof with an external crosslinking agent such as hexamethylenetetramine in order to provide a thermosettable resin which can be advanced to an infusible state upon exposure to elevated temperatures. While any external crosslinking agent can be employed herein, the preferred external crosslinking agent is hexamethylenetetramine. Generally, the preferred range of aldehyde employed herein to prepare the novolac is 0.5–0.9 moles thereof per mole of phenol and preferably 0.6 –0.8 moles thereof. While any aldehyde can be employed herein such as folmaldehyde, paraformaldehyde, acetaldehyde, butyraldehyde, furfuraldehyde, etc., the preferred aldehyde to be employed herein is formaldehyde.

When employing more than one mole of aldehyde per mole of phenol, a one-stage resin is produced which can be advanced to an infusible state by the mere application of elevated temperatures. The one-stage resin which can be employed herein is one prepared by reacting more than one mole of an aldehyde per mole of phenol and preferably 1.1–3.0 moles thereof. Again, the preferred aldehyde is formaldehyde.

In addition, it has also been observed that when using a phenolformaldehyde novolac, favorable molding characteristics are obtained when the novolac has ortho-ortho content of less than 70 weight percent of the total novolac composition. Optimum results are obtained when the ortho-ortho content is around 50 weight percent, by the balance of the novolac consists of ortho-para and para-para linkages.

By these various types of linkage, it is meant the methylene bridging between the phenol nuclei and can be represented by the following formulas:

A. 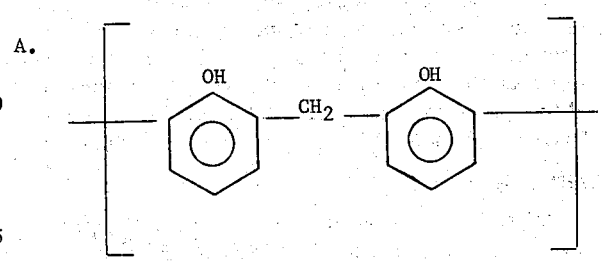

ortho-ortho linkage

B. 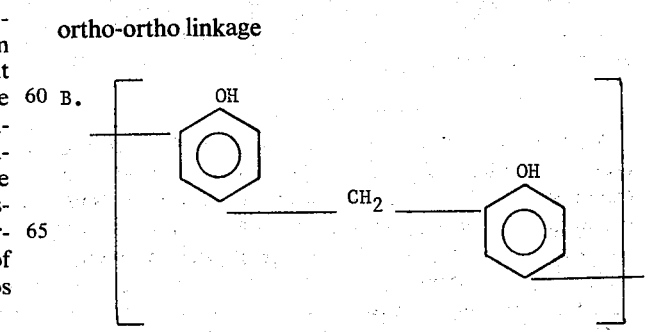

ortho-para linkage

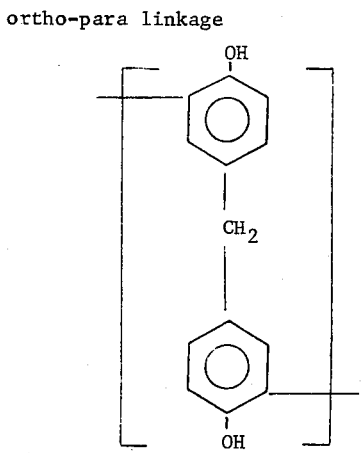

para-para linkage

The individual components of the combination of fillers of the instant invention, i.e., alumina silicate, talc and cellulose fibers are commercially available in various forms and grades. The combination of fillers can be employed in an amount of from about 15 to about 50 weight percent. Preferably the filler combination contains from about 5 to about 20 weight percent alumina silicate, from about 5 to about 20 weight percent of talc and from about 5 to about 10 weight percent of cellulose fibers. Said weight percents being based on the weight of the molding composition.

The composition of this invention is prepared by methods well known to those skilled in the art. For example, the individual ingredients are mixed together in a suitable vessel and then fed directly to the feed hopper of a screw extruder or roll mill.

It should be noted that the phenolic resin compositions of this invention can, and generally do, have present additive compounds which are normally used in such compositions in addition to the composition of this invention. Included among these other additives are fillers such as wood flour, calcium carbonate, glass fibers, etc. and any combination of these or other known fillers employed in the phenolic molding composition as well as such additives as coal, lime, stearic acid, etc. In a preferred embodiment of the instant invention, the composition of the instant invention may contain lime in amounts of from 4 to 10 weight percent. In yet another preferred embodiment the composition of the instant invention may contain coal in amounts of from 5 to 15 weight percent.

PREFERRED EMBODIMENT OF THE INVENTION

The following examples are set forth to illustrate more clearly the principle and practice of this invention to those skilled in the art and unless otherwise specified, where parts or percentages are mentioned, they are parts or precentages by weight.

EXAMPLE I

A phenol-formaldehyde resin is prepared by reacting about 0.7 moles of formaldehyde per mole of phenol in the presence of an acid catalyst, which is subsequently neutralized, to form a novolac.

The novolac is ground to a fine particle size with about 16 weight percent of hexamethylenetetramine based on the weight of novolac.

The resin mixture is then blended with 38 weight percent of asbestos fibers and 15 weight percent of wood flour to form a 50/50 mixture. The blend is then compounded in a screw extruder at about 220°F which is sufficient to melt the resin. The molten mixture is advanced through the screw and extruded into granular or pellet form.

EXAMPLE II

Example I is repeated except that a filler combination of 14 weight percent aluminum silicate, 15 weight percent of talc and 8 weight percent of cellulose fiber is used in place of the asbestos.

Each of the materials so prepared in Examples I and II are subjected to the following tests: Water Absorption, Heat Deflection (ASTM D-648), Dielectric Strength (ASTM D-149), Arc Resistance (ASTM D-495), Tensile Strength (ASTM D-651), Flexural Strength (ASTM D-790), Flexural Modulus (ASTM D-790), Compressive Strength (ASTM D-695), Izod Impact (ASTM D-256A) and the Drop Ball Impact. All test specimens are molded from conventional molding methods. The results are tabulated as follows:

TABLE I

| Test | Example II | Example I |
| --- | --- | --- |
| Water Absorption(%, 24 hr.) | 0.2 | 0.2 |
| Heat Deflection (°F, at 264 psi) | 380 | 350 |
| Dielectric Strength(60 cps, 25°C,st. VPM) | 360 | 350 |
| Arc Resistant (sec) | 180 | 180 |
| Tensile Strength (psi) | 7000 | 8000 |
| Flexural Strength (psi) | 12000 | 12000 |
| Flexural Modulus (psi) | $1 \times 10^6$ | $1 \times 10^6$ |
| Compressive Strength (psi) | 23000 | 27000 |
| Izod Impact(ft-lb/in. notch) | .30 | .33 |
| Drop Ball Impact (in. ¼ lb. weight) | 11 | 13 |

Dimensional stability refers to the ability of the molded part to maintain its dimensions within reasonable limits under a wide variety of ambient conditions; it is particularly important when the molded phenolic part is a component in a device or assembly which must rely on close part tolerances for successful operation.

This property was evaluated for the compositions of Examples I and II. The test moldings, in this case, were compression molded 1½ in. × 3 in. rectangular boxes, ¾ in. deep, with crosssections of 0.100 in. (walls) and ⅛ in. and ¼ in. (bottom).

Dimensions in both the length and width direction were tracked over a period of 15 days at room temperature, 150°F, 200°F and 250°F.

The results are tabulated as follows:

TABLE II

| Temperature | Example II* | Example I* |
| --- | --- | --- |
| Room Temperature(75°F) | 0.1 | 0.2 |
| 150°F | 1.4 | 1.3 |
| 200°F | 2.3 | 2.6 |
| 250°F | 2.9 | 3.4 |

*These numbers indicate dimensional change of length in mils per inch.

The results in Table I demonstrate that heat deflection and dielectric strength were significantly improved with the composition of Example II whereas water absorption, arc resistance, tensile strength, flexural strength, flexural modulus, compressive strength, Izod impact and drop ball impact data of Example I were comparable with Example II. Table II demonstrates that at higher temperatures the composition of Example II exhibits less overall change in dimension than the composition of Example I. Therefore, the filler combination of the instant invention provides a phenolic molding composition of comparable and better properties than a composition containing asbestos.

Example II was repeated using varying amounts of the aluminum silicate, talc and cellulose fibers. The results obtained were similar to those set forth in Tables I and II.

Obviously, other modifications and variations of the present invention are possible in the light of the above teachings. It is, therefore, to be understood that changes may be made in the particular embodiments described which are within the full intended scope of the invention as defined by the appended claims.

What is claimed is:

1. An asbestos-free, heat-resistant thermosettable phenol-aldehyde molding composition consisting essentially of in admixture, a phenol-aldehyde resin and a filler combination of aluminum silicate, talc and cellulose fibers; said filler combination present in an amount of from about 15 to about 50 weight percent based on the weight of the molding composition.

2. The composition as defined in claim 2 wherein the aluminum silicate is present in an amount of from about 5 to about 20 weight percent based on the weight of the molding composition.

3. The composition as defined in claim 1 wherein the talc is present in an amount of from about 5 to about 20 weight percent based on the weight of the molding composition.

4. The composition as defined in claim 1 wherein the cellulose fibers are present in an amount of from about 5 to about 10 weight percent based on the weight of the molding composition.

5. The composition as defined in claim 1 which contains lime.

6. The composition as defined in claim 1 which contains coal.

* * * * *